Jan. 3, 1956 G. MARKUS ET AL 2,729,009
ORNAMENTED SHEET MATERIAL AND METHOD OF MAKING SAME
Filed May 20, 1955 3 Sheets-Sheet 1
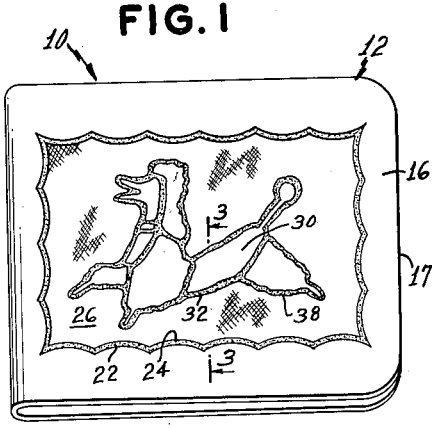
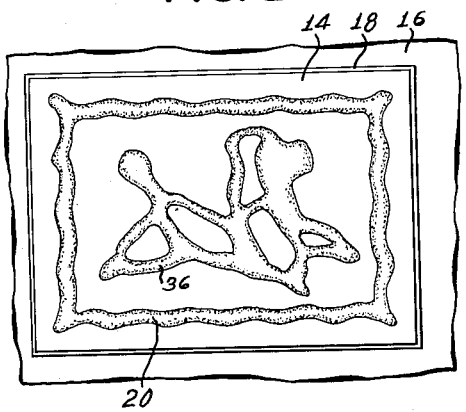
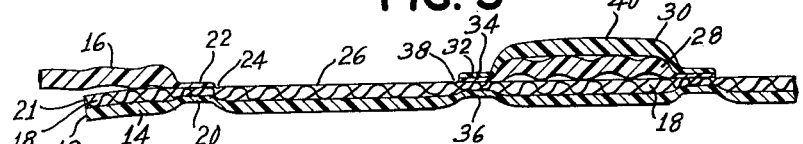
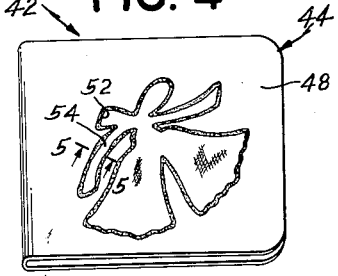
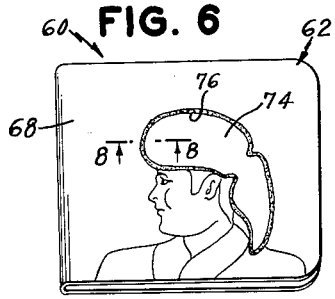
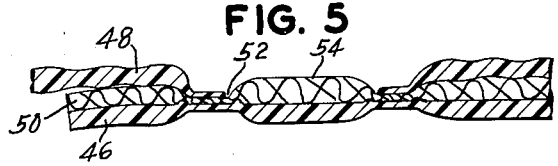
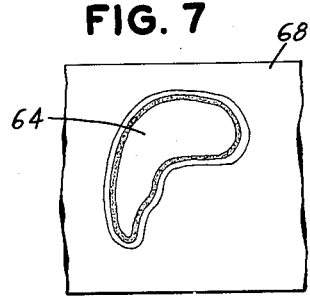
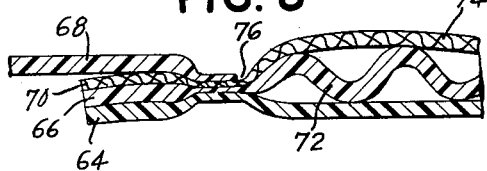
INVENTORS
George Markus
BY Martin Siegel
ATTORNEYS Jan. 3, 1956  G. MARKUS ET AL  2,729,009
ORNAMENTED SHEET MATERIAL AND METHOD OF MAKING SAME
Filed May 20, 1955  3 Sheets-Sheet 2

INVENTORS
George Markus
BY Martin Siegel
ATTORNEYS

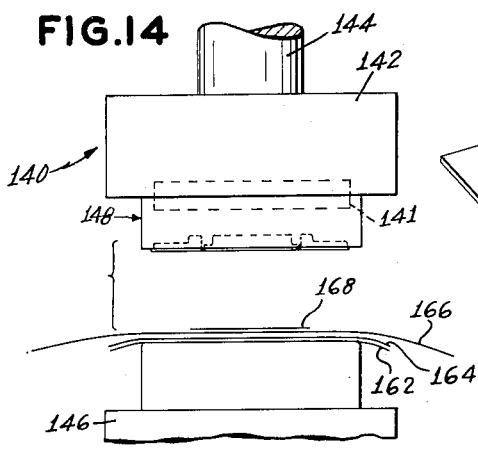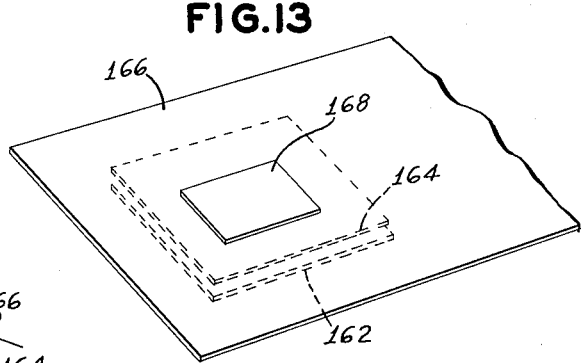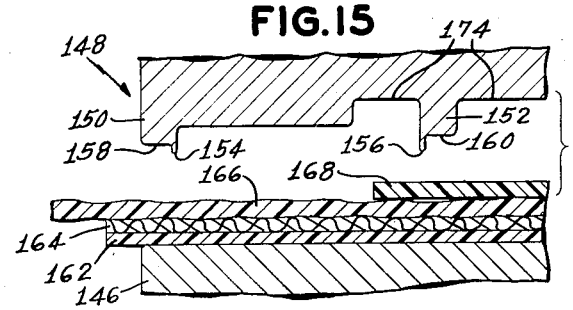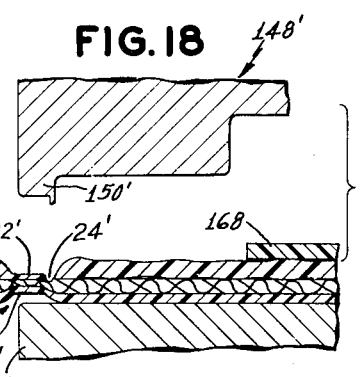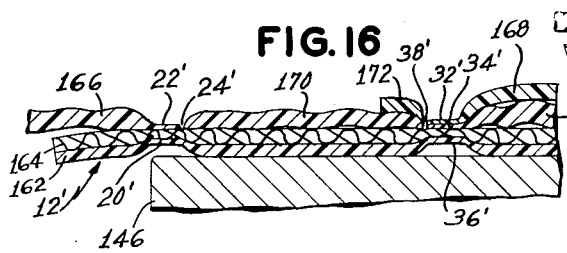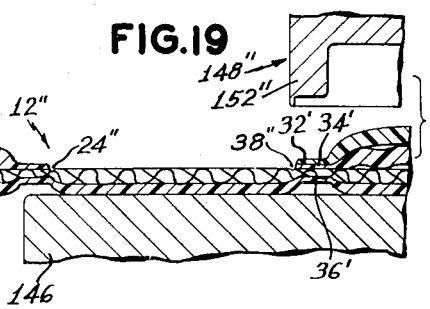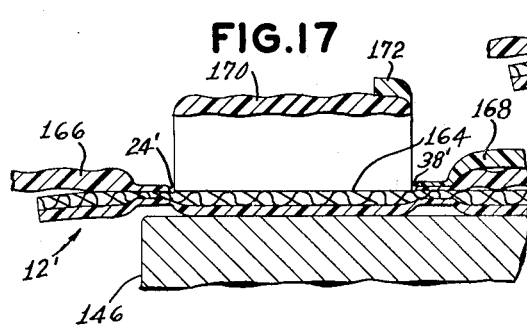

United States Patent Office 2,729,009
Patented Jan. 3, 1956

2,729,009

ORNAMENTED SHEET MATERIAL AND METHOD OF MAKING SAME

George Markus, West Orange, N. J., and Martin Siegel, Roslyn, N. Y., assignors to Aristocrat Leather Products, Inc., New York, N. Y., a corporation of New Jersey Application May 20, 1955, Serial No. 509,836

4 Claims. (Cl. 41—24)

This invention relates generally to ornamented sheet material and method of making same.

One object of the present invention is the provision of ornamented sheet material of novel construction and appearance which may be mass produced efficiently and at low cost, said ornamented sheet material being adapted to be used in a multitude of utilitarian and decorative applications, for example in the formation of wallets, vanity cases and articles, wearing apparel, seat covers, etc.

Another object of the present invention is the simplification of the art of securing plastic material to non-plastic material, such as textiles, to form an ornamental sheet assembly. Pursuant to this object of the present invention plastic material is fused and contoured in the same operation relative to the surface of non-plastic intersticed material such as textiles, whereby to form such ornamental sheet assembly.

Another object of the present invention is the provision of a method for simultaneously contouring, and heat fusing in position on the surface of textile material, plastic material, said method utilizing conventional apparatus in main and being relatively simple and inexpensive.

Another object of the present invention is the provision of a method of securing plastic sheet material to textile material without impairing or damaging the latter to form an ornamental sheet assembly which is esthetically very attractive.

Yet another object of the present invention is the provision of generally improved ornamented sheet material and method of making same.

The above and other objects, features and advantages of the present invention will be more fully understood from the following description considered in connection with the accompanying illustrative drawings.

In the drawings which illustrate the best modes now contemplated by us for carrying out our invention:

Fig. 1 is a top plan view of a wallet embodying ornamented sheet material formed according to the present invention;

Fig. 2 is a bottom plan view of the ornamented sheet material panel shown in Fig. 1;

Fig. 3 is a sectional view, on an enlarged scale, taken on the line 3—3 of Fig. 1;

Fig. 4 is a view similar to Fig. 1 illustrating another form of ornamented sheet material;

Fig. 5 is a sectional view, on an enlarged scale, taken on the line 5—5 of Fig. 4;

Fig. 6 is a view similar to Fig. 1 illustrating still another form of ornamented sheet material;

Fig. 7 is a bottom plan view of the ornamented sheet material panel illustrated in Fig. 6;

Fig. 8 is a sectional view, on an enlarged scale, taken on the line 8—8 of Fig. 6;

Fig. 13 is a top perspective view of a series of superposed layers of sheet material and is illustrative of a preliminary step in the making of the ornamented sheet material illustrated in Figs. 1–3;

Fig. 14 is a side elevational view of a press showing the layers of material illustrated in Fig. 13 positioned on the bed of the press preparatory to the fusing and contouring operation;

Fig. 15 is a fragmentary sectional view, on a greatly enlarged scale, showing the die of the press in elevated position, preparatory to the fusing and contouring operation;

Fig. 16 is a fragmentary sectional view, on a greatly enlarged scale, showing the ornamented sheet material of Figs. 1–3 in a semi-finished condition on the bed of the press;

Fig. 17 is a view similar to Fig. 16 illustrating the operation of removing plastic sheet material along the tear edges formed on the ornamental sheet material;.

Fig. 18 is a view similar to Fig. 15 showing a modified form of die in elevated position subsequent to the fusing and contouring operation pursuant to another form of making ornamented sheet material; and Fig. 19 is a view similar to Fig. 18 showing a second die which is utilized for the practice of the method illustrated in Fig. 18.

Figure 9:
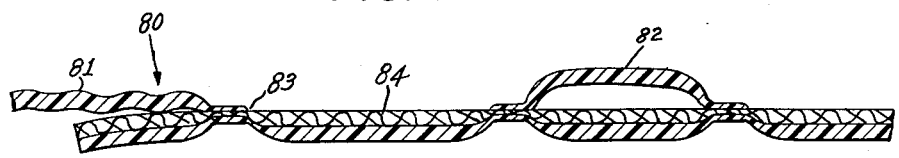
Fig. 9 is a view similar to Fig. 3 illustrating still another form of ornamented sheet material.

Referring to the drawings, and more particularly to Figs. 1–3 thereof, there is shown a wallet or billfold 10 having an outer panel 12 of ornamented sheet material which is formed according to the present invention, said panel of the instant embodiment comprising superposed layers of the thermoplastic sheet material 14 and 16 having a layer of textile material 18 secured between said thermoplastic layers in the manner to be described in detail hereinafter. The peripherally extending marginal edge portions 20 and 22 of the layers 14 and 16, respectively, are heat sealed or fused in relation to each other, and the layer 18 of textile material is secured in position between the layers 14 and 16 by the fusion of the latter layers along said marginal edge portions. The fusion of the thermoplastic layers 14 and 16 to each other defines in situ peripheral edge 24 of desired contour, said peripheral edge being a tear edge which is defined by removing portions of the layer 16 beyond said tear edge. The peripheral edge 24 of layer 16 may be of any desired contour, as will be apparent from the description which follows, and in the illustrated embodiment of Figs. 1 through 3 said edge is of generally scalloped contour. The layers 14 and 18 are generally coextensive and are precut to roughly approximate the outline 24, it being understood that said layers may be non-coextensive if desired and are of slightly larger area than the area encompassed within the peripherally continuous edge 24 so as to conserve material and yet not require exact registration between said layers and the layer 16 during the process of fusing the layers 14 and 16 to each other. The peripheral edges 19 and 21 of the layers 14 and 18, respectively, are normally concealed from view in the finished product, namely the wallet 10, embodying the ornamental panel 12. The layer 16 which extends beyond the layers 14 and 18 may be of any desired determinate or indeterminate contour and said layer is adapted to be fabricated or processed in any desired manner so as to form, or ornament articles. The layer 16 has an outer peripheral edge 17 which defines the extremities of the ornamented sheet material panel 12 of the wallet 10. Thus the layer 16 constitutes panel structure which is adapted to be processed or integrated with other materials, to form a multitude of utilitarian and/or decorative articles.

The layer 16 has an opening therethrough which is outlined by the peripheral edge 24 and which is closed by layer 18 to thereby expose the segment or portion 26 of the textile layer 18 through said opening. Fused in position on the segment 26 of the textile layer 18 are layers 28 and 30 of thermoplastic sheet material, said layers having their peripheral marginal edge portions 32 and 34, respectively, fused to each other and to the peripherally extending portion 36 of the bottom layer 14. The layer 30 defines an exposed decorative segment of any predetermined outline and the layer 28 constitutes a filler layer between the textile layer 18 and the decorative segment 30, said filler layer imparting depth to the segment 30 in relation to the segment 26. The heat sealing or fusion between the layers 14, 28 and 30 defines in situ the peripheral edge 38 which is formed in a similar manner to the edge 24, it being understood that the edge 38 is a tear edge which may be of any desired outline, said edge outlining a dog in the instant embodiment as clearly shown in Fig. 1. As will be described in further detail hereinafter, the layer 28 is initially an integral portion of the layer 16, the latter having portions thereof removed between the tear edges 24 and 38 to expose the segment 26 of the textile layer 18 and to define the filler layer 28. If desired, the outer face 40 of the decorative segment 30 may be ornamented or processed in any desired manner to achieve any desired ornamental effect. From the above it will be apparent that the ornamented sheet material 12 prominently displays the ornamental segment 30 which outlines a dog on a background constituted by a segment 26 of textile material which is framed by the peripheral edge 24 of the layer 16. In the present embodiment, all of the layers of material except layer 18 are formed of a suitable thermoplastic sheet material, for example vinyl sheet material and the layer 18 may be formed of any suitable intersticed material such as an intersticed textile material, the interstices of the textile material providing for the flow of the heated plastic material therethrough whereby to provide for the fusion of the thermoplastic layers disposed in contiguous relation with the textile material as described above. It will be further understood that the textile material utilized for the layer 18 may be of any conventional construction, for example, a woven or knitted construction, the former being presently preferred. Accordingly, while textile material is utilized for the layer 18 of the instant embodiment, it will be apparent that the present invention may be practiced by utilizing any suitable intersticed material or any non-intersticed material may be utilized after being treated to provide such material with interstices for the flow of plastic material therethrough. It will also be observed that the textile layer 18 will have thermoplastic material impregnated in the interstices thereof between the peripheral portions 20 and 22 and 32 and 36 which are fused to each other.

With reference to Figs. 4 and 5, there is shown another form of wallet or billfold 42 which has a panel 44 which is structurally similar to the panel 12 described above except in the respects to be specifically noted hereinafter. The ornamented sheet material panel 44 comprises superposed layers 46 and 48 of thermoplastic sheet material having a layer of textile material 50 secured therebetween, said layers of thermoplastic sheet material being fused to each other in the manner described above in detail relative to the ornamented sheet material 12. The fusion of the layers 46 and 48 to each other defines a tear edge 52 or layer 48 which corresponds in all respects to the tear edge 24, described above, the segment 54 of textile material outlined by the tear edge 52 being free of additional surface ornamentation corresponding to the layers 28 and 30 of the previously described embodiment. Thus the ornamented sheet material panel 44 corresponds in all respects to the ornamented sheet material panel 12 except that the ornamented sheet material panel 44 depicts an outline 52 of a different character from the outline 24 and the segment 54 is free of superposed surface ornamentation of the character defined by the layers 28 and 30.

With reference to Figs. 6–8, there is shown another form of wallet 60 having an ornamented sheet material panel 62 which is structurally similar to the panel 44 of wallet 42 except in the respects to be pointed out in detail hereinafter. The ornamental sheet material 62 comprises superposed layers 64, 66 and 68 of thermoplastic sheet material which are fused to each other in the manner described above, there being provided a layer of textile material 70 secured in position between the layers 66 and 68. The layer 66, disposed between the layers 64 and 70, forms a filler segment 72 between the layer 64 and the segment 74 of the textile material layer 70, said segment 74 corresponding to the segment 54 of the ornamented sheet material panel 44 and being outlined by the tear edge 76 which depicts a coonskin cap as will be clearly apparent from Fig. 6. The surface ornamentation 70 of the layer 68, adjacent outline 76, which in the present embodiment depicts a man's face and upper portions of his body may be formed in any desired manner, for example, by a suitable printing or coating process, or in any other suitable manner. From the above it will be apparent that the ornamented sheet material 62 is similar to the ornamented sheet material 44 except that the ornamented sheet material 62 is provided with an additional thermoplastic layer 66 for providing a filler segment 72 between the layer 64 and the segment 74, said filler segment imparting depth to the textile segment 74. It will be noted that the layers 64, 66 and 70 are substantially coextensive and generally correspond to outline 76. The corrugated pattern of the filler layer 66 is preformed therein and it will be understood that said filler layer may be of any desired surface configuration to achieve the effect desired.

With reference to Fig. 9, there is shown ornamented sheet material 80 which is similar to the ornamented sheet material 12 except that the ornamental segment 82 of sheet material 80 is fused in position on the textile segment 84 without the interposition of a filler layer therebetween. Thus the ornamental segment 82 may be fused in position on the surface of the textile segment 84 without interposing a filler layer between said ornamental and textile segments as illustrated in Fig. 9 or, if desired, a filler layer of the character of filler layer 28 may be utilized between the ornamental and textile segments as illustrated in Figs. 1–3.

Figure 10:
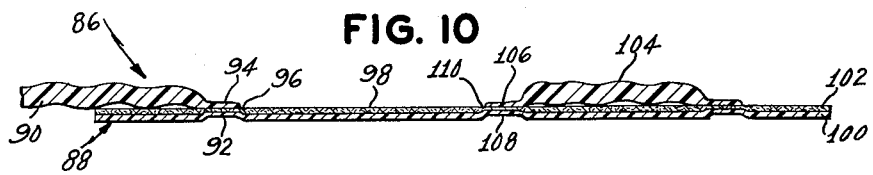
Fig. 10 is a view similiar to Fig. 9 illustrating still another form of ornamented sheet material.

With reference to Fig. 10, there is shown another form of ornamented sheet material 86 which is formed without the interposition of a textile layer between layers of the thermoplastic sheet material, said ornamented sheet material comprising layers 88 and 90 of thermoplastic sheet material which are heat sealed or fused to each other at their peripherally extending marginal edge portions 92 and 94, respectively. The fusion of layers 88 and 90 defines in situ a peripheral edge 96 of predetermined contour on the layer 90, the latter having an opening therethrough which is outlined by said peripheral edge to thereby expose or reveal the segment 98 of the layer 88 therethrough. The layer 88 of the instant embodiment is of laminated construction and consists of a lower layer 100 of thermoplastic sheet material secured to an upper layer 102 of thermoplastic sheet material having non-thermoplastic glitter material incorporated therein. Thus the glitter material of the upper layer 102 of the laminated layer 88 will be exposed in the opening outlined by the peripheral edge 96. The ornamental segment 104 of thermoplastic sheet material is fused in position on the segment 98 along the peripherally extending marginal edge portion 106, the latter being fused to the underlying peripherally extending portion 108 of the layer 88. The fusion between the portions 106 and 108 defines in situ a peripheral edge 110 of the desired contour, the edges 96 and 110 being tear edges with the segment 98 being exposed by the removal of material of the layer 90 between said tear edges. The ornamental segment 104 of the present embodiment is initially an integral portion of the upper layer 90 and is defined by the removal of portions of said layer at the tear edge 110, it being understood that said ornamental segment may be formed of different material than layer 90, if desired.

Figure 11:
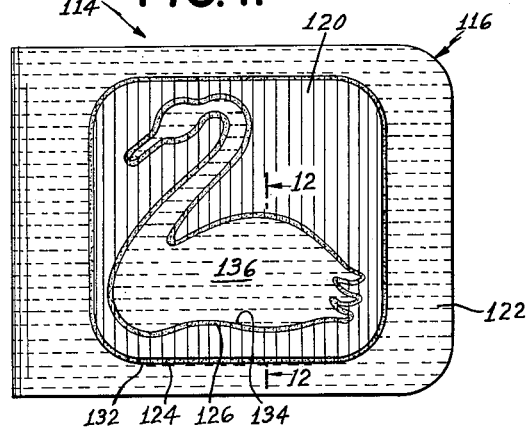
Fig. 11 is a view similar to Fig. 1 illustrating yet another form of ornamented sheet material.
Figure 12:
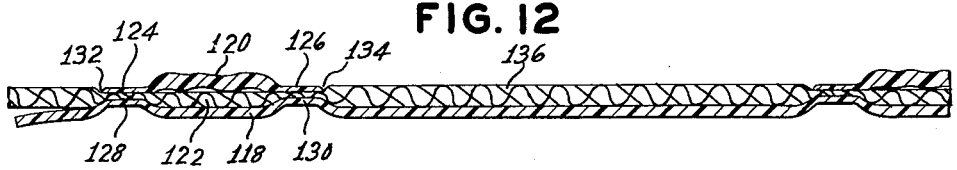
Fig. 12 is a sectional view, on an enlarged scale, taken on the line 12—12 of Fig. 11.

With reference to Figs. 11 and 12, there is shown another form of wallet 114 having an ornamented sheet material panel 116 which comprises a layer 118 of thermoplastic sheet material having a decorative segment 120 of similar material fused thereto, there being disposed a layer 122 of textile material between said layer 118 and segment 120. The outer and inner peripherally extending marginal edge portions 124 and 126, respectively, of segment or layer 120, are fused to the peripherally extending portions 128 and 130, respectively, of the thermoplastic layer 118 in the manner described above in detail, the textile layer 122 being secured in position between the layer 118 and segment 120 by the fusion therebetween. The marginal edge portions 124 and 126 of the segment 120 terminate in tear edges 132 and 134, respectively, which may be of any desired outline, said tear edge 134 outlining an opening which depicts a swan as clearly shown in Fig. 11. Accordingly, the segment 120 has an opening therethrough outlined by the tear edge 134 and the removal of material of said segment within said edge 134 will expose the segment 136 of textile material through said opening. Accordingly, the main panel layer, for example, layer 16 of the panel 12, may be constituted by thermoplastic sheet material as in the previously described embodiments or may be constituted by a layer of textile material, for example layer 122 of the present embodiment.

The apparatus 140, shown in Figs. 14 and 15, utilized for the practice of the present invention, is conventional in the main and includes a head 142 mounted at the end of the vertically reciprocable ram 144, and a stationary bed 146, it being understood that the ram is mounted for vertical reciprocation whereby to vertically reciprocate the head 142 relative to its companion stationary bed 146. Mounted on the lower end of the head 142, is a die 148 which has peripherally continuous raised face portions 150 and 152 of preselected decorative outline. The die 148 of the illustrated embodiment is adapted to form the ornamented sheet material 12 illustrated in Figs. 1–3, the face portion 150 being of an outline corresponding to outline 24 of the ornamented panel 12 and the face portion 152 being of an outline corresponding to the outline 38 of the ornamental segment 30 of said ornamented panel. As will be apparent from the description which follows, the die 148 may have face portions of any desired outline or contour corresponding to the contour of the ornamented sheet material panel to be fabricated, the specific contours illustrated and described herein being given by way of example only. The face portions 150 and 152 of the die 148 are provided with peripherally continuous projecting edge portions 154 and 156, respectively, of an outline corresponding to the outline of said face portions, said projecting edge portions 154 and 156 being adapted to simultaneously form the peripheral tear edges 24 and 38, respectively, of the ornamented sheet material 12. The peripheral edges 158 and 160 of the die faces 150 and 152, respectively, are adapted to heat seal or fuse the layers of thermoplastic sheet material to each other in a manner to be described in detail hereinafter, there being provided conventional electronic equipment 141 in the head 142 to effect an electronic heat seal between the superposed layers of thermoplastic sheet material. Accordingly, the conventional electronic heat sealing equipment 141 is adapted to act through the peripheral edges 158 and 160 of die 148 to effect an electronic heat sealing operation between the superposed layers of plastic sheet material.

In the practice of the present method for forming the ornamented sheet material 12, the layers 162, 164, 166 and 168 are superposed on each other in that order as clearly shown in Figs. 13 and 14 and this superposed layer assembly is disposed on the bed 146 of the apparatus 140. All of these superposed layers are formed of thermoplastic sheet material except the layer 164 which is formed of a suitable textile material. In the practice of the present method the registry between the superposed layers is not critical, it being only necessary to provide for registry of the areas thereof which are to be fused or heat sealed to each other. To effect a fusion or heat seal between the thermoplastic layers and to secure the textile layer 164 between adjacent thermoplastic layers 162 and 166, the ram 144 is reciprocated in a downward direction so as to reciprocate the die 148 into operative association with the work disposed on the bed 146 of the apparatus 140. The die faces 150 and 152 will be effective to simultaneously fuse the plastic layers to each other along the peripherally continuous outlines 24' and 38', respectively, which correspond to the outline of said die faces. In the fusing or heat sealing operation the peripheral edge portions 20' and 22' will be fused to each other along the outline 24' and plastic material from said layers will flow through or penetrate the interstices of the textile layer 164 to bond or fuse the layers 162 and 166 to each other. The peripheral edge portions 32', 34' and 36' will be similarly fused to each other along the outline 38' and plastic material from the layers of thermoplastic sheet material will flow through the interstices of the textile layer 164. Accordingly, on the activation of the electronic equipment 141 the peripheral edges 158 and 160 of the die 148 will sufficiently heat the plastic layers to cause a fusion thereof along the outlines 24' and 38', this operation effecting the flow of plastic material through the interstices of the textile layer whereby to effect a fusion between peripheral edge portions of plastic layers. The edge portions 154 and 156 of the die faces 150 and 152, respectively, project beyond their companion edges 158 and 160, respectively, to define the tear edges 24' and 38', respectively, simultaneously with the above described heat sealing of the plastic layers. From the above it will be apparent that the die 148 is effective to fuse or heat seal the plastic layers to each other along the peripherally continuous outlines 24' and 38' and to simultaneously define tear edges along said outlines, said tear edges being of an outline corresponding to the outline of their corresponding die faces. The semi-finished assembly 12' is formed into the finished assembly or ornamented sheet material assembly 12 by removing sheet material 170 and 172 of the layers 166 and 168, respectively, along the tear edges 24' and 38' (Fig. 17). The removal of the sheet material portions 170 and 172 disposed between the tear edges 24' and 38' will define an opening in the layer 166 which is outlined by said tear edges. The removal of the portion 172 of the layer 168 along the tear edge 38' will form said layer into the finished ornamental segment 30 shown in Figs. 1 through 3. Thus the filler layer 28' is initially an integral portion of the layer 166 and is formed into the finished filler layer 28 by removing the material 170 at the tear edge 38'. In Fig. 17 there is illustrated the operation of removing the sheet material portions 170 and 172 along the tear edges 24' and 38' to form the semi-finished assembly 12' into the finished assembly 12. The die 148 is recessed as indicated at 174 adjacent the die face 152 in order to provide the requisite amount of clearance for the additional layer of thermoplastic sheet material 168 which is adapted to form the ornamental segment 30. The edge 160 is at a higher level than the edge 158 on die 148 in order to take care of the additional layer of material 168 which is fused to the other layers by said edge 160.

If desired, the aforedescribed operation of heat sealing or fusing the plastic layers to each other and the formation of the tear edges outlining the fused portions may be carried out in separate die operations. Thus in Fig. 18 there is shown a die 148' which has a die face 150' which corresponds in all respects to the die face 150 previously described, said die face 150' being adapted to fuse the peripherally extending portions 20' and 22' to each other and to form the tear edge 24'. Subsequent to this heat sealing operation the layer 168 is superposed on the assembly 12" and a second die 148" having a die face 152" which corresponds to the die face 152 previously described is brought into operative engagement with the semifinished assembly 12" to fuse the peripheral edge portions 32', 34' and 36' to each other in a manner previously described and to form the tear edge 38'. From the above it will be apparent that the entire fusing operation may take place in a single operation as described with reference to Figs. 14, 15 and 16 or may be performed in two separate operations as described above with reference to Figs. 18 and 19. It will be understood that subsequent to the second heat fusion or die operation for forming the tear edge 38' and for fusing the plastic layers to each other outlined by said tear edge, the portions 170 and 172 are removed from the tear edges 24 and 38 in the manner previously described.

The ornamented sheet material 44 is formed in a similar manner to the ornamented sheet material 12 except that in the case of the ornamented sheet material 44 a layer corresponding to the layer 168 is not utilized; it being noted that the ornamented sheet material 44 is provided with a single peripherally extending tear edge 52 which exposes the segment 54 which is free of surface ornamentation corresponding to the ornamental segment 30 of the ornamented assembly 12. The ornamented sheet material 62 is formed in a similar manner to the ornamented sheet material 44 except that in the case of the ornamented sheet material 62 an additional layer of thermoplastic sheet material is disposed below the layer of textile material, said additional layer of thermoplastic sheet material being adapted to form the filler layer 72 which imparts depth to the ornamental segment 74.

The ornamented sheet material 80 is formed pursuant to the method described above relative to the formation of the ornamented assembly 12 except that in the case of the ornamented assembly 80 the ornamental segment 82 is not provided with a filler layer disposed therebelow, and said ornamental segment may be formed pursuant to either the single or two-stage die operation described above. Where the ornamental segment 82 is formed of the same material as the layer 81 the ornamented sheet material 80 may be formed by the single-stage die operation described above, it being apparent that where the ornamental segment 82 is formed of different material than the layer 81 a two-stage die operation is necessary in order to provide for the removal of the material outside of the tear edge 83 prior to the operation of fusing the ornamental segment 82 in position on the segment 84.

With reference to the ornamented sheet material 116, the plastic layers 118 and 120 may be heat sealed to each other in either a single stage die operation or in a two-stage die operation as described above, it being noted that the ornamental segment 120 is provided with outer and inner peripheral edge portions 124 and 126, respectively, which are heat sealed to companion edge portions of the bottom layer 118 of thermoplastic sheet material.

It will be understood that the thermoplastic layers are fused or heat sealed to each other by means of the apparatus 140, for example, and the electronically energized dies described above are applied to the plastic layers with sufficient pressure to effect the aforedescribed fusion and the formation of the tear edges.

The method for forming the ornamented sheet material assembly 86, illustrated in Fig. 10, involves the use of an electrically heated die as described in our application Serial No. 470,869, filed November 24, 1954, now U. S. Patent No. 2,710,046, for Ornamental Sheet Material and Method of Making the Same, said application being assigned to the assignee of the present application.

The ornamented sheet material described above may be utilized in any desired application, for example in the formation or ornamentation of shoes, hats, dresses, and other articles of wearing apparel, receptacles, vanity cases, seat covers, etc. The layers of thermoplastic sheet material may be formed of the same material or they may be formed of different compatible materials so that such materials will fuse together in the aforedescribed manner. The various layers of material described above of the ornamented sheet material assemblies may be plain or ornamented, and may be colored or surface ornamented in any desired manner whereby it will be apparent that a practically limitless number of effects may be achieved. If desired, the active faces of the dies described above may be engraved in any desired manner whereby to form a complementary impression in the resultant ornamented sheet material. It will be apparent from the above that the various outlines or peripheral contours illustrated and described above are given by way of example only and that any desired outline may be provided on the ornamented material, the die faces of the die being shaped to provide the desired outline.

Certain features shown and described herein are claimed in the above referred to co-pending application Serial No. 470,869, and in our co-pending application Serial No. 490,869, filed February 28, 1955, for Ornamental Sheet Material and Method of Making the Same, the latter application being also assigned to the assignee herein.

While we have shown and described the preferred embodiments of our invention, it will be understood that various changes may be made in the idea or principles of the invention within the scope of the appended claims.

Having thus described our invention, what we claim and desire to secure by Letters Patent, is:

1. The method of providing an ornamental assembly, comprising the steps of superposing layers of thermoplastic sheet material on the opposite sides of a layer of textile material, heat fusing the said layers of thermoplastic material through the interstices of said textile layer along peripherally extending spaced lines providing preselected decorative outlines and simultaneously defining spaced tear edges on one of said layers corresponding to said outlines, said heat fusion of said thermoplastic layers thereby securing said textile layer in position between said thermoplastic layers along said spaced peripherally extending lines, and thereafter removing from said one layer along said tear edges the portions thereof which extend between said tear edges to provide an opening therethrough having edge contours corresponding to said preselected outlines and to expose surface portions of said textile layer through said opening.

2. Ornamented material, comprising a plurality of layers including inner and outer layers which comprise thermoplastic material and are disposed in superposed relation, one of said layers at one side thereof being fused to another of said layers by said thermoplastic material along a line defining a tear edge on said other layer and outlining an opening closed by said one layer, said one layer having a surface area exposed through said opening and comprising intersticed material impregnated with thermoplastic material in the interstices of said one layer at the portion thereof which is fused to said other layer, and a securing layer comprising thermoplastic material fused to said one layer at the opposite side thereof at said portion of the said one layer.

3. Ornamented sheet material, comprising a plurality of layers disposed in superposed relation, one of said layers being intersticed and disposed between two others of said layers, the latter having thermoplastic surface material contiguous to the opposite surfaces, respectively, of said intersticed layer, said two other layers being heat sealed to each other through the interstices of said intersticed layer along a line of fusion of predetermined contour defining in situ an edge of corresponding contour on at least one of said two other layers, said edge of the one of said two other layers outlining an opening closed by said intersticed layer with the latter having a surface area exposed through said opening.

4. Ornamented sheet material having superposed layers comprising thermoplastic sheet material and a layer of intersticed material secured between said superposed layers, said superposed layers being fused in relation to each other along a line defining in situ an edge of predetermined contour on one of said layers spaced from the outer edge thereof, said one layer having an opening therethrough outlined by said edge of predetermined contour to expose to view said intersticed layer, said intersticed layer having superposed thereon in position in said opening a layer comprising thermoplastic sheet material and thermoplastic filler material disposed between said last mentioned layer and said intersticed layer, said last mentioned layer and said filler material being fused in position along a line of fusion defining edges of predetermined contour on said last mentioned layer and said filler material, respectively.

References Cited in the file of this patent

UNITED STATES PATENTS

| | | |
|---|---|---|
| 2,321,740 | Flint | June 15, 1943 |
| 2,710,046 | Markus et al. | June 7, 1955 |